United States Patent [19]

Holliday et al.

[11] 3,953,389

[45] Apr. 27, 1976

[54] PREPARATION OF POWDERED RUBBERS

[75] Inventors: Gilbert John Holliday, Shrewsbury; John Norris, Clanfield, near Portsmouth, both of England

[73] Assignees: BP Chemicals International Limited, London; G. J. Holliday (Plastics) Limited, both of England

[22] Filed: May 28, 1975

[21] Appl. No.: 581,494

Related U.S. Application Data

[63] Continuation of Ser. No. 435,738, Jan. 23, 1974, abandoned.

[52] U.S. Cl. ............................. 260/23.7 M; 526/5; 526/216; 526/335; 526/342; 260/45; 260/85 R; 427/214
[51] Int. Cl.² .................... C08C 3/00; C08C 4/00; C08K 11/00; C08K 11/72
[58] Field of Search ................ 260/23.7 M, 94.7 R, 260/94.7 A, 85.1, 83.3; 450/774, 775.5

[56] References Cited

UNITED STATES PATENTS

| | | | |
|---|---|---|---|
| 2,953,556 | 9/1960 | Wolfe et al. | 260/94.7 |
| 3,194,781 | 7/1965 | Hedberg et al. | 260/33.6 |
| 3,281,387 | 10/1966 | Wood et al. | 260/30.8 |

FOREIGN PATENTS OR APPLICATIONS

| | | | |
|---|---|---|---|
| 1,037,125 | 7/1966 | United Kingdom | 450/775.5 |

*Primary Examiner*—William F. Hamrock
*Attorney, Agent, or Firm*—Brooks Haidt Haffner & Delahunty

[57] ABSTRACT

Process for the preparation of a free-flowing powdered rubber by treating a rubber with an aqueous dispersion of an anti-tack agent and suspending the rubber in powdered form in a stream of gas (e.g. air), removing at least part of the water and subsequently treating the powdered rubber with a dusting material.

9 Claims, No Drawings

PREPARATION OF POWDERED RUBBERS

This is a continuation of application Ser. No. 435,738, filed Jan. 23, 1974, now abandoned.

The present invention relates to a process for the preparation of rubbery materials in a free-flowing powdered form.

Rubbery materials are well known and are usually available in the form of either an aqueous latex or as solids e.g. crumb, sheet or ship. However, there is an increasing demand for rubbery materials in the form of free-flowing powders which have known advantages in some compounding and processing techniques. Whilst the preparation of rubbery materials in powder form is known, their production and use has hitherto been hindered by the difficulty of making the powders free-flowing, both immediately after production and subsequently after packaging and storage.

It is an object of the present invention to provide a process for the treatment of powdered rubbery materials to render them substantially permanently free-flowing.

According to the present invention, a process for the treatment of a rubbery material comprises adding an aqueous dispersion of an anti-tack agent to the rubbery material and suspending the rubbery material in a powdered form in a stream of a gas, removing at least part of the water and subsequently treating the powdered rubbery material with a dusting powder.

A preferred process for the treatment of the rubbery material comprises adding an aqueous dispersion of an anti-tack agent to the powdered rubbery material suspended in a stream of a gas, removing at least part of the water and subsequently treating the powdered rubbery material with a dusting powder.

The gas can be any gas that does not deleteriously affect the rubbery material or apparatus in which the process is conducted, for example, air or nitrogen.

The rubbery materials suitable for use in the process of the present invention are any of the known materials which are capable of being converted from the known solid forms into a powdered form. Examples include the rubbery copoylmers of butadiene with styrene or acrylonitrile. The process of the present invention is not limited to the preparation of powdered pure rubbers, and can be used for the preparation of for example, powdered masterbatches of rubbery materials and other materials such as carbon black, PVC and other modifiers, provided that such other materials do not prevent the rubbery material from being converted into a powder form.

The rubbery materials for use in the process of the present invention can be powdered by any of the techniques known for converting dry rubbery materials in slab, chip, crumb or other large particulate form to fine powders. The preferred method is by passing the rubbery material through an air-attrition mill, in which coarse ground rubbery material is conveyed through the mill by a current of air. The material is led through eddy zones in which it is subjected to such extensive movements, pressure fluctuations and power loads that an intensive grinding operation is caused, increased also by the abrasion of the particles against one another. An example of such a machine is the Altenburger Ultra-Rotor.

In a further aspect of the present invention, rubbery materials are powdered in an air-attrition mill using an air supply at a temperature below the ambient termperature. This can be achieved by any of the conventional techniques such as refrigeration or the use of liquefied gases. This increases the efficiency of the grinding action and eases the grinding of the tackier rubbery materials. It is also envisaged that the rubbery materials can be cooled preferably to a temperature below their glass transition temperatures as an alternative to or in addition to the use of a low temperature air supply. In this way very soft rubbery materials can be ground, which materials would, in normal operation, clog the rotors of air attrition mills.

The powdered rubbery materials employed in the process of the present invention most suitably have an average particle diameter in the range 3000 to 300 microns, although powders having particle diameters outside this range can also be used, provided that they are capable of being suspended in an air stream.

Powdered rubbery materials prepared by air attrition mills are obtained as a powder suspended in a stream of air. Powdered rubbery materials can be prepared by other techniques, and in the process of the present invention are suspended in a gas stream. The gas (e.g. air) stream is advantageously hot to remove the water from the anti-tack agent dispersion without deleteriously affecting the properties of the rubbery material being processed.

Suitable anti-tack agents include surfactants, for example the sodium and potassium salts of long chain, soap forming, fatty acids and other known soap forming materials. The surfactant can be used alone or alternatively it can be blended with particulate mineral fillers such as chalk. The preferred anti-tack agent is a material sold under the trade name Larco Bantac Plus which is a mixture of surfactants and finely divided mineral fillers.

Other suitable anti-tack agents include Bantac and Bantac 152 supplied by Anchor Chemical Co., Antidust F supplied by Rhein Chemie, Anti-tack D31 supplied by Compounding Ingredients Limited and Aquarex D supplied by Du Pont U.K. Ltd., The amount of anti-tack agent added to the rubbery material should be sufficient to ensure that in combination with the subsequent addition of dusting powder, the produced powdered rubber is free flowing. When Bantac Plus is used, suitable amounts can be within the range 1 gal. to 10 gals./ton of dry rubber of a 25% aqueous suspension of the anti-tack agent.

The aqueous dispersion of anti-tack agent can be added to the rubbery material before powdering but is preferably added to the gas suspension of powdered rubbery material. The volume of the aqueous dispersion is preferably sufficient to enable the anti-tack agent to be evenly distributed on the rubbery material in the powdered form.

The aqueous dispersion of anti-tack agent is preferably metered into the gas stream in which the powdered rubbery material is suspended to ensure an even distribution.

When the water has partially evaporated from the treated gas suspension of powdered rubbery material it is preferably further treated by the addition of the dusting agent to the gas stream.

Sufficient water should be removed to enable the dusting powder to be added to the powdered rubber without "caking" due to the presence of wet particles occuring.

Suitable dusting agents include finely divided mineral materials such as talc and bentonite, organic materials such as finely divided PVC and other known dusting agents.

The particularly preferred dusting agents are the zinc and calcium salts of long chain fatty acids such as stearic acid in fine powder form.

The quantity of dusting agent used should be sufficient to provide an even coating on the particles. It will be appreciated that because of the variation the specific gravities of the suitable dusting agents, the quantity used will vary considerably depending on the choice of agent. However, it is generally preferred to use the minimum amount of dusting agent necessary to ensure that the powder is free flowing in order to keep the ash content of the final product to a minimum and to avoid the presence of free dusting agent.

The dusting agent can be added while the powdered rubber is suspended in the gas stream, or, alternatively, the powdered rubber can be first isolated from the gas stream, and subsequently coated with the dusting agent. In either case, the isolation is preferably achieved by use of a cyclone or similar separator, and after separation the powdered rubber is optionally graded into different particle sizes.

In the case where the powdered rubber is isolated before being coated with the dusting agent, the dusting agent is suitably applied by any of the known means.

Rubber modifiers and additives such as antioxidants, accelerators and the like can be added to the rubbery materials either before or after powdering if it is desired to have such materials present in the powdered rubbery material produced according to the process of the present invention.

In the case where the powdered rubber is coated with dusting agent before being isolated from the gas stream, the dusting agent is preferably applied by metering it into the air stream.

The process of the present invention is further illustrated with reference to the following Example.

EXAMPLE

A cold polymerised nitrile rubber of 35% acrylonitrile content (Breon 1042) in dry crumb form was ground into a powder in an Altenburger Ultra-Rotor air attrition mill. The resulting powder, suspended in the air stream from the mill was treated with a 25 wt % aqueous solution of Larco Bantac Plus at a rate of 1 gal solution per ton of powder. The powder was then separated in a cyclone and sieved. The sieved powder was transferred to a bagging plant by screw conveyer, the screw also acting as a mixer for incorporating zinc stearate powder as a dusting agent.

The resulting powdered rubber was free flowing and remained so after 2 weeks storage.

We claim:

1. A process for the preparation of a free-flowing powdered rubber which comprises reducing a rubber to a fine powder by air attrition in which coarse ground rubbery material is conveyed through a comminution zone by a current of air, adding an aqueous dispersion of an anti-tack agent to the fine powdered rubbery material and suspending the rubbery material in a powdered form in a stream of a gas, removing at least part of the water, and subsequently treating the powdered rubbery material with a dusting powder.

2. A process as claimed in claim 1 wherein the aqueous dispersion of anti-tack agent is added to the powdered rubbery material suspended in a stream of a gas.

3. A process as claimed in claim 1 wherein the gas is air.

4. A process as claimed in claim 1 wherein the rubbery material is a copolymer of butadiene with styrene or acrylonitrile.

5. A process as claimed in claim 1 wherein the air supply to the air attrition mill is at a temperature below ambient temperature.

6. A process as claimed in any claim 1 wherein the rubbery material is cooled to a temperature below ambient temperatures before being powdered.

7. A process as claimed in claim 1 wherein the anti-tack agent is a sodium or potassium salt of a long chain, soap forming, fatty acid.

8. A process as claimed in claim 7 wherein the anti-tack agent further contains a particulate mineral filler.

9. A process as claimed in claim 1 from 1 gallon to 10 gallons of a 25% aqueous suspension of the anti-tack agent are added per ton of rubbery material.

* * * * *

UNITED STATES PATENT OFFICE
CERTIFICATE OF CORRECTION

PATENT NO. : 3,953,389

DATED : April 27, 1976

INVENTOR(S) : GILBERT JOHN HOLLIDAY and JOHN NORRIS

It is certified that error appears in the above-identified patent and that said Letters Patent are hereby corrected as shown below:

On the Title Page, insert the following:

-- [30] Foreign Application Priority Data

January 29, 1973   United Kingdom....... 4453/73
March 15, 1973   United Kingdom....... 12404/73 --

Signed and Sealed this

Twentieth Day of July 1976

[SEAL]

Attest:

RUTH C. MASON
*Attesting Officer*

C. MARSHALL DANN
*Commissioner of Patents and Trademarks*